June 27, 1972    R. W. YOUNG ETAL    3,672,752
PHOTOGRAPHIC FILM EXPOSURE AND VIEWING
SYSTEMS USING CODED FILM CASSETTE
Filed Dec. 31, 1970    3 Sheets-Sheet 1

INVENTORS
RICHARD W. YOUNG &
MURRAY E. MALIN

BY Brown, Mikulka & Robert F. Zinn
ATTORNEYS

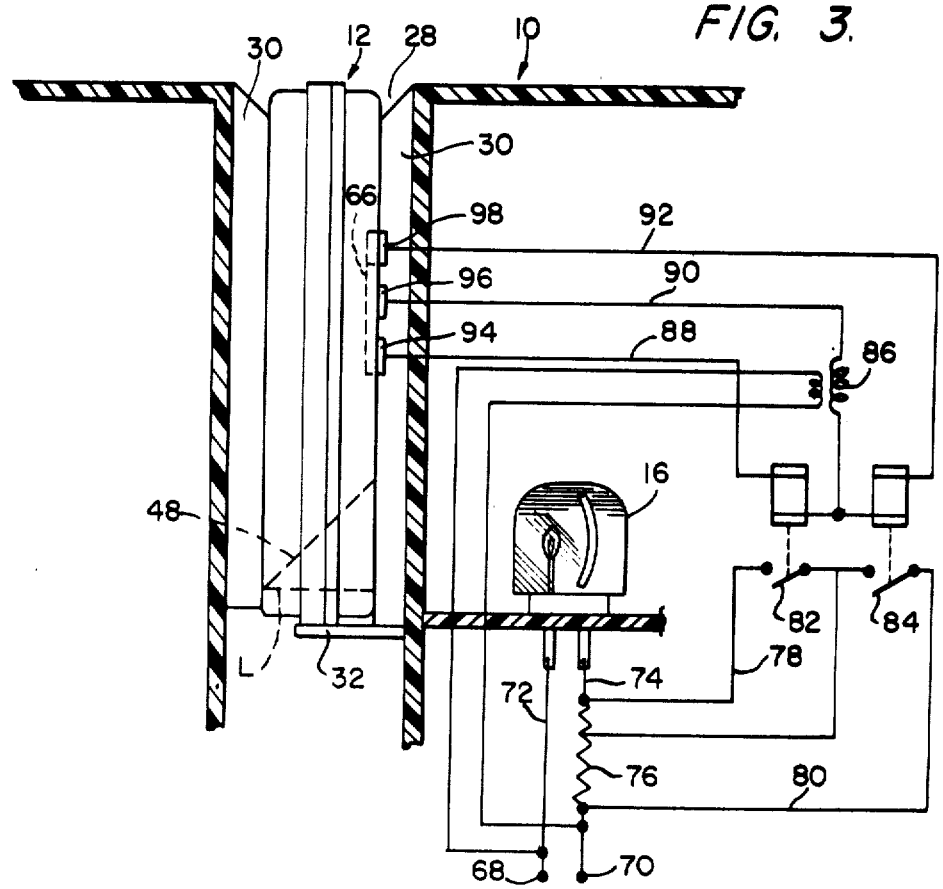
FIG. 3.
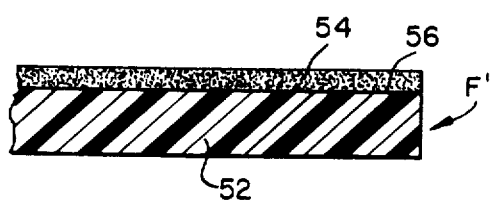
FIG. 4.
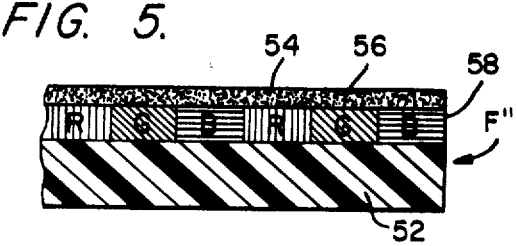
FIG. 5.
FIG. 6.
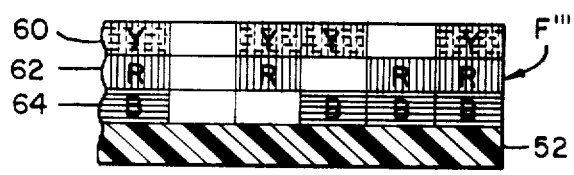
INVENTORS
RICHARD W. YOUNG &
MURRAY E. MALIN
BY Brown, Mikulka & Robert F. Ziems
ATTORNEYS

INVENTOR
RICHARD W. YOUNG &
MURRAY E. MALIN

United States Patent Office 3,672,752
Patented June 27, 1972

3,672,752
PHOTOGRAPHIC FILM EXPOSURE AND VIEWING
SYSTEMS USING CODED FILM CASSETTE
Richard W. Young, Wellesley Hills, and Murray E. Malin,
Lexington, Mass., assignors to Polaroid Corporation,
Cambridge, Mass.
Filed Dec. 31, 1970, Ser. No. 103,172
Int. Cl. G03b 21/00, 19/18
U.S. Cl. 352—72                                       10 Claims

ABSTRACT OF THE DISCLOSURE

A photographic film transparency exposure and projection system in which the film is contained in a cassette mountable in both the camera and the projector of the system. The cassette is provided with a coding element corresponding to the projection density of the particular film contained therein, which element cooperates with the projector to regulate the projection light intensity automatically during projection of the developed film. In addition, the coding element has a film sensitivity value to enable its use in the camera to regulate camera exposure parameters during film exposure.

BACKGROUND OF THE INVENTION

This invention relates to photographic film exposure and viewing systems using coded film cassettes and more particularly, it concerns improvements in such systems by which a code means on the cassette is correlated to the light filtering density of the exposed film contained in the cassette to regulate projection light intensity during viewing by projection after exposure. The code means is also provided with a value corresponding to the sensitivity of the unexposed film thereby to enable its use to regulate camera operating parameters during exposure.

Photographic film exposure and projection systems have been developed which are especially suited for motion picture taking and viewing and which employ cassettes to contain the film during exposure, processing or developing, and during projection or viewing. In one such system, the cassette, when initially loaded with film, is also provided with a cartridge of developing fluid so that after exposure of the film with the cassette mounted in a camera, the cassette is mounted in a viewer or projector equipped with means for effecting application of the developing fluid to the film prior to projection of the sequence of image frames thereon for viewing. The film used in the system referred to is developed by diffusion transfer of a negative image in a light sensitive emulsion layer to a positive image receiving interface provided on the film carrier base. To achieve color transparencies with such film, an additive color producing system is provided by a mosaic or raster of color filters interposed between the carrier base and the image receiving interface. Hence, upon projection of light through the developed film, a substantial amount of the light is absorbed by the color filters. Such absorption of light is readily compensated for merely by selecting a projection lamp capable of developing sufficient light intensity to achieve the desired brilliance in the projected image.

Should it be desired to use the same projector for viewing other types of film which do not possess the light absorbing characteristics of projection density of the film referred to, however, the resulting projected image is likely to be too bright for comfortable viewing. This phenomenon can be appreciated by comparison of the film referred to above with the presently more conventional color substractive system film transparencies in reproducing a white image. In the additive color system of the film referred to in the preceding paragraph, the white appearance of the projected image is effected by projecting the light of the projection lamp through red, green and blue color filters carried by the film. Thus the intensity of the light reaching the surface from which the projected image is viewed is several times less than that of the intensity of the illumination source or the projection lamp. Using film employing the subtractive color system, a white appearing image is produced by projecting white light through a transparent portion of the film. Thus, where the intensity of light emitted from the projection lamp is constant, the brightness of the image with film using the subtractive color system will be on the order of several times that of film using the additive color system. A similar problem is presented where the projection lamp is used for viewing both color film using the additive color system described and black and white film. In this instance, the black and white film will have lower light absorbing characteristics than the additive color system film.

In addition to the differing projection densities of film which might be contained in a given cassette, the sensitivity of the negative image receiving emulsion will vary with different types of film. For example, the sensitivity or speed of black and white film is much higher than that currently available with color films. To account for such differences in film sensitivity, some provision must be made for adjusting the exposure parameters of the camera within which the film containing cassette is received during exposure of the film. Hence, there is a need for an exposure and projection system in which both the camera and the projector thereof can be readily adjusted to account for the respective differences in film speed and exposed film density or light absorbing characteristics.

SUMMARY OF THE PRESENT INVENTION

In accordance with the present invention, the cassette containing the film is provided with a coding element on an exterior surface thereof, which element functions in cooperation with circuit components provided in both the projector and the camera of the exposure and projection system with which it is used, to adjust automatically both the projection light intensity of the projector to a proper value for the density or light absorbing characteristics of the film contained in the cartridge after development and exposure and also to adjust the operating parameters of the camera, within which the cassette is receivable, to a value corresponding to the sensitivity or speed of the film in the cassette. Although the coding element may take numerous specific forms, depending on the arrangement employed in the projector and camera, one contemplated embodiment involves the use of a resistance element which engages contacts in the viewer or projector lamp circuit to bring about adjustment of the intensity of the projection lamp to a value corresponding to the projection density of the developed film. When the cassette is inserted into the camera, the same resistive strip engages a pair of spaced contacts in a conventional aperture adjusting photoelectric circuit, the resistive value of the strip between the contacts corresponding to the sensitivity or speed of the film contained in the cassette.

Among the objects of the present invention are: the provision of an exposure and viewing system for photographic film transparencies by which density or light absorbing characteristics of the film during projection are accounted for automatically by coding means physically located on the cassette containing the film and by which the film is properly mounted in the camera and/or projector of the system; the provision of such a system by which film sensitivity or speed is also accounted for automatically by the same coding means; the provision of a coding means by which the aforementioned functions are performed and which is simply and economically mounted on a film cassette; and the provision of a cassette coding means which is readily adapatable to designating films of diverse sensitivites and/or densities and/or combinations thereof.

Other objects and further scope of applicability of the invention will become apparent from the detailed description to follow taken in conjunction with the accompanying drawings.

BRIEF DESCRIPTION OF THE DRAWING

FIG. 3 is an enlarged fragmentary cross-section taken on line 3—3 of FIG. 1 and incorporating a circuit diagram to be used in the projector;

FIGS. 4, 5 and 6 are respectively enlarged fragmentary cross-section through diverse types of films having different projection densities;

DETAILED DESCRIPTION OF THE PREFERRED EMBODIMENTS

Figure 1:
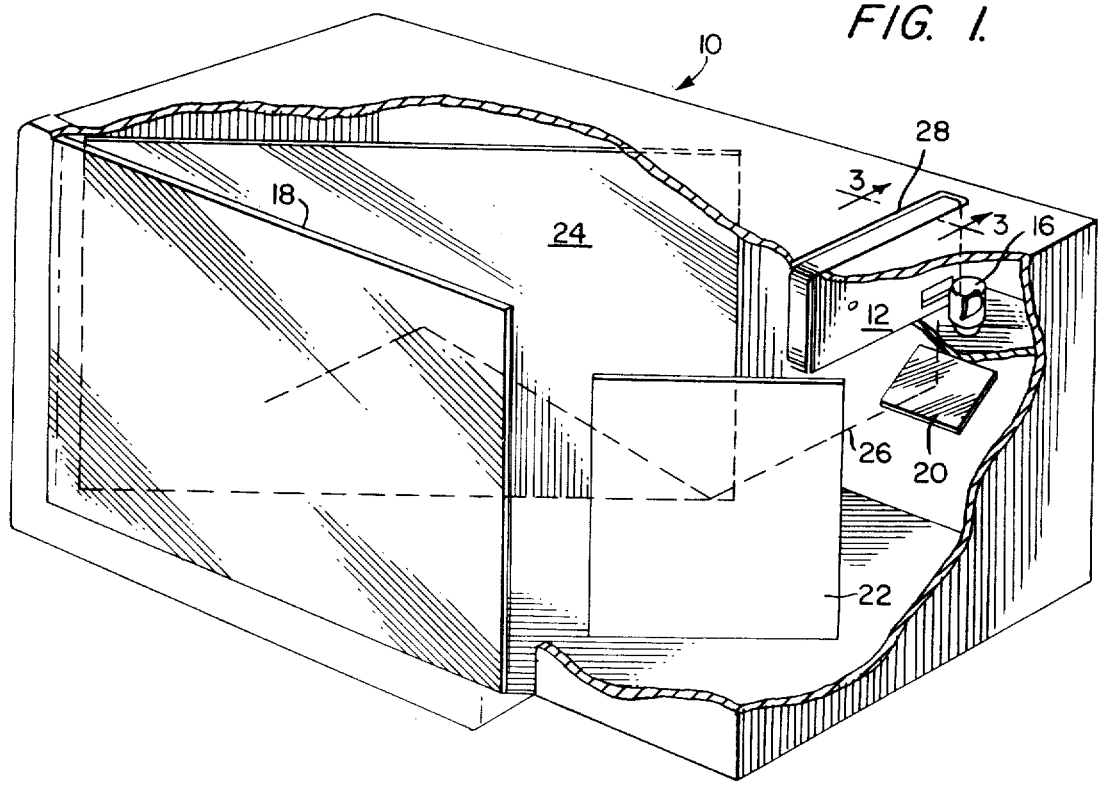
FIG. 1 is a fragmentary perspective view illustrating the basic components of a film viewing projector adapted to be used with the system of this invention.
Figure 2:
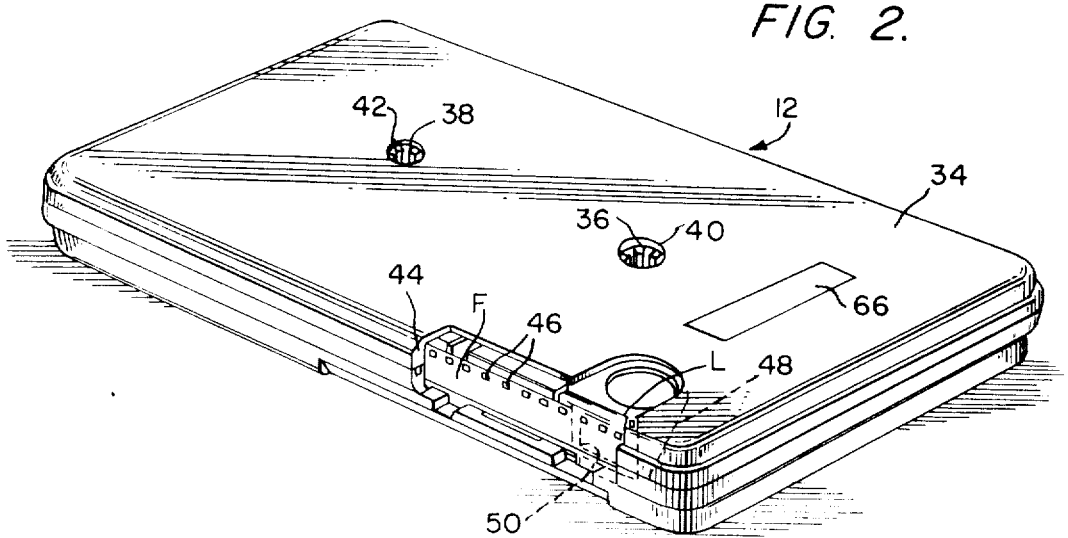
FIG. 2 is a perspective view of a film cassette of this invention.
Figure 7:
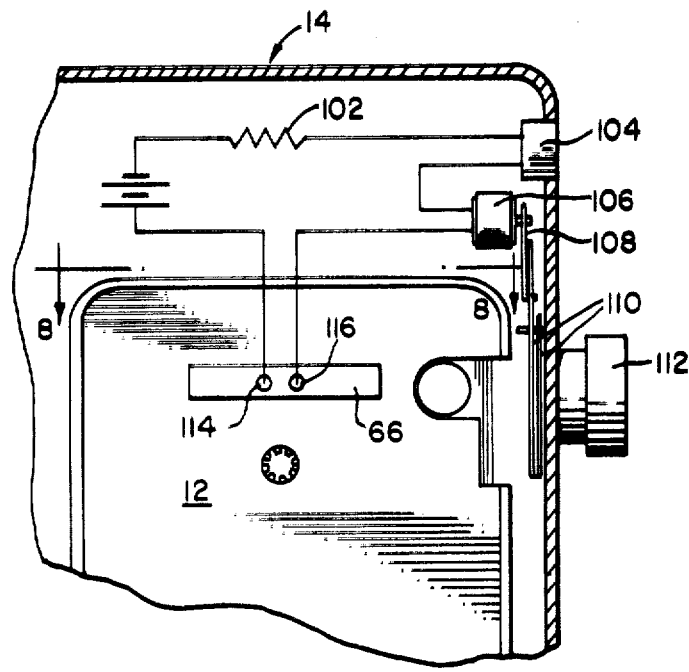
FIG. 7 is a fragmentary side elevation, partially in cross-section, depicting the cassette of this invention mounted in a camera.

The photographic film exposure and viewing system of this invention is shown in the drawings to include generally a viewer 10 in FIG. 1, a cassette 12 in FIG. 2, and a camera 14 in FIG. 7. Although many of the operating components normally incorporated in the viewer 10, the cassette 12 and the camera 14 have been omitted from the drawings in the interest of clarity, it will suffice for purposes of understanding the present invention to note that the viewer 10 in the disclosed embodiment is of the rear screen projection type in which light emitted from a projection lamp 16, after passing through the film F and a projection lens L in the cassette 12, is directed to the rear face of a viewing screen 18 by mirrors 20, 22 and 24 through the path depicted by the dash line 26. The cassette 12 is properly positioned within the viewer 10 by its reception in a viewer housing well 28 having guide ribs 30 and a stop ledge 32 as shown in FIG. 3 of the drawings.

The cassette 12, as shown most clearly in FIG. 2, takes the form of a rectangular shaped outer housing 34 within which the film F is contained for passage between supply and take up spools having splined hubs 36 and 38 aligned with apertures 40 and 42 in the housing 34 to be engaged by appropriately splined drive shafts of the viewer and camera (not shown).

To enable exposure and projection of the film F in the cassette 12, a portion of the housing 34 on one side is cut out as at 44 to enable incremental advance thereof by conventional claw mechanisms (not shown) in the viewer and camera with the uniformly spaced series of apertures 46 in the film. Also a reflecting prism 48 and framing gate 50 are mounted in the cassette to enable projection of light from the lamp 16 in the viewer through the film and to the viewing screen 18 in the manner above mentioned.

Also it is contemplated that the cassette 12 may be of the type disclosed in a co-pending application Ser. No. 838,783 filed July 3, 1969 by the inventors Rogers B. Downey, Philip G. Baker and Gerald H. Cook, and assigned to the assignee of the present invention. As disclosed in that application, a cartridge or pod of developing fluid is contained in the cassette and arranged to be operated by a mechanism in the viewer to process or develop the film F after exposure using the diffusion transfer technique. Inasmuch as the film F can be exposed, processed and viewed without removal from the cassette, it is permanently associated with the cassette once loaded therein for marketing distribution.

To provide a clearer understanding of the present invention and its objectives, reference is made to FIGS. 4–6 of the drawings which illustrate greatly enlarged cross-sections through film transparencies having different light absorbing characteristics or projection densities. The film F', depicted in FIG. 4, typifies a film transparency upon which an image may be carried for black and white reproduction and which may be developed by the diffusion transfer technique. Hence, the film F' includes a transparent carrier base 52 on which a light sensitive negative receiving emulsion 54 is carried, the emulsion and the base being separated by a positive image receiving interface 56. In FIG. 5, a similar film transparency F" is illustrated, though for reproducing the image carried thereon in full color. In this instance a raster layer 58 formed by adjacent lines of red, green and blue color filters (in actual practice, the lateral dimension of the individual filters being microscopic in size) is provided between the positive image receiving interface 56 and the transparent carrier base 52. In exposing the film F", light reflected from the object to be photographed is transmitted through the carrier base and raster layer 58 to the light sensitive emulsion 54. Upon coating the emulsion 54 with a diffusion transfer developing fluid, the image is transferred to the interface 56. Though the positive image on the interface 56 is black and white, it represents a color reproduction of the object photographed by virtue of the light passing through the color filters in the raster 58.

During viewing of the film F" illustrated in FIG. 5, projection light is passed from the emulsion side of the film through the interface 56, the raster layer 58 and the transparent carrier base 52 to reproduce the image in color by virtue of the addition color system provided by the raster layer 58. In other words, the reproduction of a white image projected on to the screen 18 will be as a result of the superimposing of light pasisng all three of the red, green and blue filters. Because of the light absorbing or filtering characteristic of the raster layer 58 during projection, the film F" will have a substantially higher projection density than the film F' shown in FIG. 4. Thus it will be appreciated that the projection lamp intensity during viewing the film F" must be greater than that during viewing of the film F' assuming that the same level of brilliance is to be maintained at the viewing screen 18 of the viewer 10, for example.

A similar situation is presented where the viewer is to be used with more conventional films employing a subtractive color system. Such a film is designated by the reference letter F''' in FIG. 6. In such films, three layers of emulsion 60, 62 and 64 are supported on a carrier base 52 in which three separate black and white images corresponding to different chromatic values are produced. After developing, the emulsion layers are treated in dye-coupler developers to reproduce the color of the object photographed in the film. The projection density of the film F''' is lower than the film F" in that the quantity of light absorbed corresponds directly to the color hues to be reproduced in the projected image; i.e., a white appearing image portion being reproduced by a film portion having no filtering characteristics whereas black is reproduced by a total filtering of light.

Also it will be appreciated that in any one of three types of film illustrated in FIGS. 4–6, the sensitivity or speed of the film emulsion may vary. For example, the black and white film F' shown in FIG. 4 may be made with emulsion having different speeds, most of which will be higher than either of the color film shown in FIGS. 5 and 6. While this factor is of little or no consequence with respect to projection density or regulation of the intensity of projection light, it will call for an adjustment of the operating parameters of the camera in which the cassette is mounted for exposing the film. Specifically, the diaphragm aperture settings for the camera will be larger for the color films of FIGS. 5 and 6 than the higher speed black and white film of FIG. 4, assuming the same shutter speed.

To effect automatically, a correlation of both film projection density and film speed in the projection and in the camera of the system of this invention, the cassette housing 34 is provided with an electrical coding element or code indicator in the form of a strip 66 shown for example in FIGS. 2, 3 and 7 of the drawings. The strip 66 is formed of any suitable material such as various metals, plastic materials impregnated with conductive particles and the like which will effect functionally a conductor having a low resistance value capable of variation with the composition of the material selected. As will be pointed out more in detail below, the strip 66, in the embodiment shown, is employed as a conductor to regulate the intensity of the lamp 16, when the cassette 12 is inserted in the viewer 10, and as a resistance element to adjust the diaphragm opening of the camera 14 when the cassette is inserted therein for exposure of the film F.

As shown in FIG. 3 of the drawings, the power circuit for the projection lamp 16 includes a pair of terminals 68 and 70 for connection to a conventional AC power source and lines 72 and 74 extending from the terminals to the lamp 16. The line 74 includes a multitap resistor 76 associated with a pair of shunting circuits 78 and 80. The shunting circuits 78 and 80 are activated respectively by relay switches 82 and 84, power for the relays being supplied by a step down transformer 86 and a circuit including lines 88, 90 and 92 connected respectively to contacts 94, 96 and 98 to be engaged by the strip 66 when the cassette 12 is received in the well 28 of the viewer 10.

Figure 9:
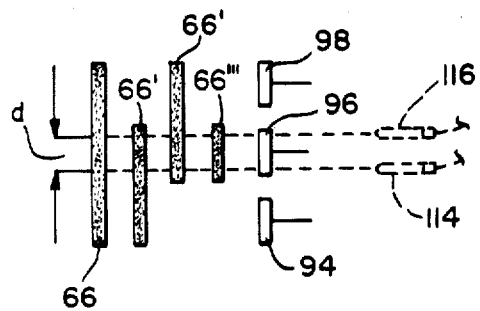
FIG. 9 is a schematic view illustrating the correlation between several diverse coding elements and the contacts employed respectively in the circuits of the viewer and of the camera of the system of this invention.

Thus, where the film contained in the cassette 12 has a higher projection density, such as the film F″ illustrated in FIG. 5 of the drawings, the strip 66 on the cassette will be of a length to interconnect all three of the terminals 94, 96 and 98, thereby closing both relay switches 82 and 84 to shunt out the entire resistance element 76 in the power circuit of the lamp 16. Where the strip 66 is of a length sufficient to bridge the three terminals, therefore, maximum projection lamp intensity is developed. Should the film contained in the cassette have a low projection density, such as the black and white film F′ of FIG. 4, the strip 66 will be of a length to shunt out either a portion of or none of the resistance element 76 to effect a lower projection lamp intensity corresponding to the density of the film transparency in the cassette. It will be appreciated, for example, that by virtue of the position of the taps on the resistor 76 to which the shunting circuits 78 and 80 are connected, four different projection light levels can be achieved; the inclusion in the power circuit of the total resistance 76, two-thirds of the resistance when the shunting circuit 78 is energized by closing the relay 82, one-third of the resistance element by energizing the shunting circuit 80 or none of the resistance by energizing both shunting circuits 78 and 80. The variations of projection lamp intensity provided by different sizes and positions of the strips 66 on the cassette are depicted in FIG. 9 of the drawings.

Figure 8:
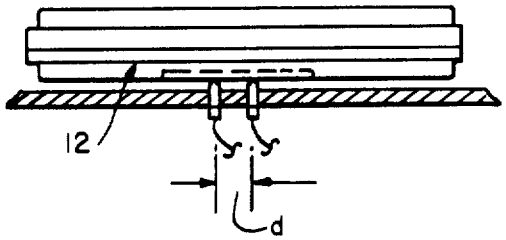
FIG. 8 is a fragmentary cross-section on line 8—8 of FIG. 7.

To regulate automatically, the diaphragm opening in the camera 14 to accommodate films having different sensitivities or emulsion speeds, the resistance value of the strip 66 is selected to correspond with the film speed. As shown in FIGS. 7 and 8 of the drawings, the camera 14 includes a conventional automatic aperture setting circuit including a battery 100, a current limiting resistance 102, a photocell 104 and a galvanometer 106. In accordance with conventional practice, the galvanometer 106 is equipped with an arm 108 for regulating the pivotal action of a pair of aperture defining blades 110 to regulate the amount of light passing through the camera lens 112 to the film contained in the cassette 12. The photoelectric circuit thus defined includes, in addition, a pair of contact elements 114 and 116 spaced by a distance $d$ as shown in FIGS. 8 and 9 of the drawings. Inasmuch as the distance between the contacts 114 and 116 will remain constant, the resistance value imposed on the photoelectric circuit will be a function of the resistance value of the strip 66 through the distance $d$. Hence, for high speed emulsions of the type used with black and white film, the resistance value of the strip 66 would be lower than that used with relatively slow color film, thereby increasing the current to the galvanometer to effect a smaller diaphragm opening with the blades 110 for a given quantity of light reflected from the object being photographed to the photocell 104.

Thus it will be appreciated that by this invention there is provided a unique coding system for film cassettes by which both projection density and exposure sensitivity of film can be accounted for automatically in the viewer and camera respectively of a film exposure and viewing system and by which the above mentioned objectives are completely fulfilled. Also, it will become apparent to those skilled in the art that variations and/or modifications of the disclosed embodiment of the present invention can be made without departing from the true spirit and scope thereof. While the projection light intensity of the projector is automatically adjusted in the illustrated embodiment of the invention by controlling the intensity of the light energy emitted from the projector's lamp, the same desired end result may, if desired, be obtained by other arrangements. For instance, instead of varying the light energy emitted from the lamp itself, a neutral density filter (or filters) may be displaceably mounted within the projector for selective movement into and out of the optical path responsive to the code indication on the cassette. Also, if desired, a controlled aperture arrangement, again responsive to the code indication on the cassette, may be employed in the projector to vary the projection light intensity at the viewing screen. Further, it will be recognized that alternate code indicating means may be employed on the cassette, e.g., electrical components other than a resistor, or protuberances, notches or other suitable mechanical arrangements. Accordingly, it is expressly intended that the foregoing description is illustrative only of a preferred embodiment, not limiting, and that the true spirit and scope of the present invention be determined by reference to the appended claims.

We claim:

1. In a projector for use with film handling cassettes adapted to alternately retain one of a plurality of film transparencies of differing densities and having code means corresponding to the density of the particular film within such cassette, the improvement comprising:

means for mounting a projection light source;

means for controlling the projection light intensity of said projector responsive to such code means being disposed in operative relationship therewith; and means for mounting such cassette in said projector with such code means thereof in operative relationship with said projection light intensity controlling means.

2. In a projector for use with film handling cassettes adapted to alternately retain one of a plurality of film transparencies of differing densities and having code means corresponding to the density of the particular film within such cassette, the improvement comprising:

means for mounting a projection light source;

means for controlling the intensity of light energy emitted from such light source responsive to such code means being disposed in operative relationship therewith; and means for mounting such cassette in operative relationship with such light source with such code means thereof in operative relationship with said light energy intensity controlling means.

3. The apparatus recited in claim 2 in which said means for controlling the intensity of light energy comprises electric circuit means including such code means when the cassette is mounted in operative relation to said light source.

4. In a photographic film projector having a light source and means to support a film cassette in operative position relative to said light source for projection of light through film contained in said cassete, the improvement comprising means to reglate the intensity of light directed to said film thereby to account for variations in film density, and code means carried by said cassette, said code means corresponding to the density of film contained in said cassette and being operable, when said cassette is in said operative position, to control said intensity regulating means.

5. The apparatus recited in claim 4 wherein said regulating means comprises an electric circuit having terminal contacts located in said projector to be engaged by said code means when said cassette is in said operative position.

6. The apparatus recited in claim 5 wherein said code means comprises an operative component of said electric circuit.

7. In a film handling cassette adapted to alternately retain one of a plurality of film transparencies of differing densities and to be selectively operably associated with a projector having means for mounting said cassette, means for mounting a light source, means for controlling the projection light intensity of such projector responsive to a code indicator being disposed in operative relationship with such projection light intensity controlling means, the improvement comprising a code indicator corresponding to the density of the particular film within said cassette positioned on said cassette to be disposed in operative relationship with such projection light intensity controlling means when said cassette is disposed in such mounting means.

8. In a film handling cassette adapted to alternately retain one of a plurality of film transparencies of differing densities and to be selectively operably associated with a projector having means for mounting said cassette, means for mounting a light source, means for controlling the intensity of light energy emitted from such light source responsive to a code indicator being disposed in operative relationship with such light intensity controlling means, the improvement comprising a code indicator corresponding to the density of the particular film within said cassette positioned on said cassette to be disposed in operative relationship with such light intensity controlling means when said cassette is disposed in such mounting means.

9. In a film handling cassette adapted to alternately retain one of a plurality of film transparencies of differing exposure sensitivities and of offering projection densities and to be first operably associated with a camera having means for mounting said cassette and means for controlling exposure parameter settings of such camera responsive to a code input being disposed in operative relationship with such exposure parameter settings controlling means and then operably associated with a projector having means for mounting said cassette, a light source, means for controlling the intensity of light energy emitted from such light source responsive to a code indicator being disposed in operative relationship with such light intensity controlling means, the improvement comprising a code indicator corresponding to both the exposure sensitivity and density of the particular film within said cassette positioned on said cassette to be disposed in operative relationship with such exposure parameter settings controlling means when said cassette is disposed in such camera mounting means and to be disposed in operative relationship with such light intensity controlling means when said cassette is disposed in such projector mounting means.

10. In an exposure and viewing system for photographic film transparencies having respectively diverse exposure sensitivities requiring differing specific camera exposure parameter settings during exposure and diverse projection densities requiring projection light intensities on viewing, the improvement comprising: a cassette containing photographc film of given light sensitivity and of given projection density, said cassette being receivable in a camera for exposure of said film and receivable in a projector for viewing said film after exposure, and code means carried by said cassette and corresponding both to the exposure sensitivity and projection density of said film contained therein for adjusting automatically the exposure parameters of the camera during exposure of said film and projection light intensity during viewing of said film after exposure thereof.

References Cited

UNITED STATES PATENTS

| 3,584,942 | 6/1971 | Downey | 352—78 R |
| 3,492,927 | 2/1970 | Thiele et al. | 352 —78 C |
| 2,244,965 | 6/1941 | Roberts | 355—83 X |
| 2,101,932 | 12/1937 | Eggert et al. | 355—83 |
| 3,600,071 | 8/1971 | Downey | 352—78 R |

FOREIGN PATENTS

| 1,451,597 | 7/1966 | France | 352—78 C |
| 1,222,370 | 8/1966 | Germany | 352—78 C |

JOSEPH F. PETERS, JR., Primary Examiner

U.S. Cl. X.R.

352—78 R, 198; 353—85